2,917,439
Patented Dec. 15, 1959

2,917,439

METHOD FOR METALLIZING NON-CONDUCTIVE MATERIAL

Hsing Liu, Bayside, N.Y.

No Drawing. Application January 3, 1957
Serial No. 632,274

7 Claims. (Cl. 204—22)

This invention relates to processes for metallizing electrically non-conductive materials such as quartz, glass, ceramics, hard rubber, natural and synthetic resins, such as phenol-condensation products, urea resins, cellulosic plastic materials, laminates such as epoxy resin impregnated fiberglass systems. The principal object of this invention is to provide a convenient, dependable and inexpensive process for metallizing electrically non-conductive materials.

Another object of this invention is to provide a process for treating electrically non-conductive materials so that an exceptionally adherent metal coating may be applied thereto.

Another object is to provide a novel and improved method for applying to the surfaces of the electrically non-conductive materials an exceptionally adherent conductive metal base layer, more adherent than achieved by any process prevailing in industry, and capable of receiving subsequent electro-deposition; without deleterious effect on the adhesion of the base metal layer.

Various other objects and advantages will become apparent as the nature of the invention is more fully disclosed hereinafter.

The present process comprises in general the treating of the surface of a material, not capable of being metal coated in the usual electroplating manner, with a specially formulated adhesive layer, the thickness of said adhesive layer being between 0.001″ as a minimum and 0.005″ as a maximum; curing said adhesive layer to a semi-cured stage known to the field as "B-stage" then applying a metallic film such as nickel, copper, silver, gold, etc. Optionally, the metallic film may in turn be coated with another metal using conventional electroplating techniques. The adhesive layer is then cured with or without pressure.

Prior art processes for performing the metallization of non-conductive materials have produced poorly adherent metallic coatings especially when the total metal layer was in excess of 0.0005″. Increased adhesion using the prior art processes required roughening as for example by sandblasting or abrasion or depolishing of the surface to achieve mechanical interlocking of the metallic film for best adhesion. The new method herein described requires no depolishing or roughening to achieve adhesion but involves literally "cementing" the metal layer or layers to the non-conductive surface using the proper adhesive followed by heat with or without pressure. Heat accompanied by pressure is preferred for maximum results with regards to adhesion.

Typical of the prior art methods over which this invention represents an improvement is the use of coating materials containing metallic powders or flakes incorporated in an organic medium. These methods have also proven to give poor results because the organic binder often fully or partially coats the isolated metallic particles or flakes resulting in poor conductivity. Furthermore, using this method if a metal layer is to be applied by electroplating excessive periods of time will be required in the plating bath with correspondingly high cost in production.

Specifically, the present invention involves cleaning the non-conductive surface by alkaline cleaning agents, detergents or suitable organic solvents and then drying the surface thoroughly. The non-conductive surface is then coated with an adhesive having the property of hardening when cured which may be applied by spraying, dipping, brushing, roller-coating or using the so-called "doctor-blade technique" so that the adhesive layer is from 0.001″ thick to 0.005″ thick. The adhesive film is then partially cured to the partially polymerized or so-called "B-stage" care being exercised to avoid complete polymerization. A conductive film of nickel, copper, silver, gold, or other metal or combinations of metals including alloys is then applied by chemical reduction using a formulation suitable for the particular desired metal film or combination of metals. It is of critical importance that the film deposited by chemical reduction be formed in a porous state and not a dense state for reasons to be discussed more fully hereinafter. As is well known to those engaged in the art, the time of immersion of the treated non-conductive surface, the composition of the solution and the temperature of the metallic film-forming solution controls the degree of porosity of the film. In Example 1 below, a procedure is discussed which yields a porous nickel film. The metallic film is then electroplated, if desired, in the conventional manner. In some instances, this electroplating operation is not required. The entire part being processed is then heated to cure the adhesive layer which is under the metal coating to the "C-stage" using heat and pressure.

It is most important and necessary for best results in this invention that the conductive metal be porous in structure. Dense films will only give fair results. Best results are obtained with the porous films because of the nature of the process since it has been clearly observed during the development of this process that when heat and pressure are applied to the metallized part in the final step described, that the adhesive exudes through the pores in the metallic film further anchoring the film to the non-conductive surface and, as an end result, the adhesion of the electro-deposit if one is applied over the metallic film is improved since it is further attached to the metallized film not only electrochemically but through the medium of the exuded and subsequently cured adhesive. Pressure in addition to heat makes this phenomenon even more prevalent. Peel strengths with a minimum of 10 lbs. per inch strip and a maximum of 20 lbs. per inch strip have been obtained on XXXP grade phenolic laminate.

EXAMPLE 1

A sheet of XXXP grade phenolic laminate was cleaned in toluol and then dried thoroughly. A 1:1 polyamide epoxy resin mixture adhesive was then applied using a "doctor-blade" to give an adhesive film thickness of .005″ thick. The laminate sheet was then semi-cured to the so-called "B-stage" at 190° F. for 15 minutes. The part was then "sensitized" for one minute in 10% stannous sulfate. It was rinsed thoroughly and then treated with an activator, in this case 0.1% gold chloride for one minute and then again rinsed thoroughly. The part was then immersed in a nickel plating bath until a porous film having a thickness of .00001″ was formed.

Bath composition:

| | | |
|---|---|---|
| Nickel sulfate | grams | 35 |
| Sodium citrate | do | 10 |
| Sodium acetate | do | 10 |
| Sodium hypophosphite | do | 15 |
| Magnesium sulfate | do | 20 |
| Duponol C (1% by wt. solu.) | cc | 10 |
| Water | cc | 1000 |

Temperature 185°–195°.
pH 5.6–5.8.
Time of immersion, 2 minutes.

The part was successively rinsed in cold water and then in hot water and dried in an oven.

The part was then heated to 350° F. for five minutes using 500 p.s.i.

EXAMPLE 2

A sheet of a copolymer of vinyl acetate with vinyl chloride was coated with a 0.002" thick layer of partially polymerized (B-stage) phenol formaldehyde. The coated sheet was rinsed thoroughly with a 1% by weight solution of stannous chloride in isopropanol. The thus cleaned and sensitized sheet was rinsed with water and then exposed to an air-mixed spray of silver ammonio nitrate designated as solution A below, while concurrently mixing therewith in air, a liquid spray of the reducing agent designated as solution B and prepared as described below. The mixed spray was directed against the surface of the mold until there resulted a dull mottled metallic silver deposit. (It was found that longer continued spraying produced a bright continuous film which was not desired.) The spraying was then discontinued and the silver coated sheet was rinsed in water and thus prepared for the customary electroplating procedure. Upon electroplating with copper it was found that a highly satisfactory electrically conductive surface was formed. The sheeting was then heated in a press at a pressure of 2500 p.s.i. and a temperature of 300° F. The resultant coating was found to be adherent.

Solution A is prepared by dissolving 2½ ozs. of silver nitrate in about one-half gallon of water, then adding aqueous ammonia until the precipitate which first forms is redissolved and thereafter diluting the resulting mixture to a total volume of one gallon. Solution B is prepared by dissolving 9 fluid ozs. of 37% formaldehyde solution in about one gallon of water adding thereto sufficient triethanolamine to make 0.6% by weight of finished solution. Alternatively, the formaldehyde component can be replaced by adding 2½% by volume of a 30% glyoxal concentrated solution to one gallon of the diluted triethanolamine solution.

EXAMPLE 3

A sheet of cellulose acetate was drawn slowly across a bath of fuming dimethyl silicon dichloride, $$(CH_3)_2SiCl_2$$

and permitted to hydrolyze for a few minutes in the atmosphere of the room. The sheet was then coated with a 0.005" layer of urea formaldehyde (B-stage) by a "doctor-blade." The coated sheet was drawn through a freshly mixed silvering solution containing the following components in the amounts specified.

*Solution A*

| | | |
|---|---|---|
| Water | cc | 25 |
| Sugar | grams | 2 |
| $HNO_3$ (cover) | drops | 10 |

Boil for 5 minutes and cool.

*Solution B*

| | | |
|---|---|---|
| Water | cc | 40 |
| $AgNO_3$ | grams | 2 |
| NaOH | gram | 1 |

*Solution C*

| | | |
|---|---|---|
| Water | cc | 15 |
| $AgNO_3$ | gram | 1 |

Enough $NH_4OH$ was added to solution B to redissolve the brown precipitate which formed. Solution C was then added to solution B until a slight darkening was produced. A fresh mixture of 1 part of A was added to 4 parts of the combined B and C to give the silvering solution.

The sheet was removed before a continuous film was formed. After washing in tap water, a 0.010" layer of copper was electrochemically deposited by means of a standard plating bath. The sheet was then placed in a compression press equipped with heated platens and heated to 325° at a pressure of 3000 p.s.i.

The coating was found to be adherent even when the 1/32" thick sheet was flexed.

EXAMPLE 4

An article formed of fibre glass impregnated with epoxy resin was carefully washed under a live steam jet to ensure that it was perfectly clean. A layer of melamine formaldehyde (B-stage) 0.003" thick was applied by spraying.

The article was then immersed at a temperature of 25° for five minutes in a solution containing fifteen grams of quinone per thousand grams of water. After washing with ordinary water, the article was immersed into a 0.1 M stannous chloride solution washed and immersed into an 0.001 M solution of auric hydrate and washed with distilled water. The article was then immersed in the silvering solution, of Example 3 and removed before a continuous silver coating was obtained.

EXAMPLE 5

A glass body was washed and coated with a 1:2 polyamine epoxy resin layer 0.002" thick. Instead of silvering a film it was desired to coat it with copper. Accordingly, the silver metallization bath of Example 3 was replaced by the following solution:

| | | |
|---|---|---|
| Tartaric acid | grams | 1.08 |
| NaOH | do | 0.9 |
| Crystallized copper sulfate | do | 3.24 |
| Ammonia (20%) | cc | 3 |
| Formaldehyde-hydrosulphite | grams | 0.00 |
| Ammoniacal iron sulfate (Mohr's salt) | do | 2.93 |
| Commercial formaldehyde (35%) | cc | 0.747 |
| Water | cc | 36 |

The solution is allowed to act for about 5 minutes at room temperature, to wit about 25° C., then washed abundantly and dried. A thin porous coating resulted. A further layer of copper was deposited by electroplating in a standard bath. After washing the resin was cured by heating at 300° F. for 1 hour. The coating was adherent and conductive.

Thus, in the foregoing examples a range of materials have been disclosed by way of example. Other suitable adhesives include types which may be fused by heat such as methyl methacrylate, alkyd resins, polyamides and vinyl chloride acetate polymers.

Still other suitable adhesives include phenolic polyamide mixtures, phenolic vinyl acetate mixtures, polymethanes and polyesters. Obviously, the foregoing listings are by way of illustration and are not intended to be limiting.

It is to be appreciated that any metal which may be chemically deposited, may be deposited on almost any non-conductive material following the teachings of this invention.

Having thus disclosed the best mode presently contemplated for carrying out the invention, it is to be understood that various changes and modifications may be made by those skilled in the art without departing from the spirit of the invention.

What is claimed is:

1. The process of metallizing electrically non-conductive articles comprising the steps of providing said article with a coating of a thermosetting adhesive which cures in stages and which is selected from the group consisting of polyamide epoxy resins, phenol-formaldehyde resins, urea-formaldehyde resins, and melamine-formaldehyde resins; partially curing said adhesive to the "B" stage; depositing a porous metal layer on said partially cured adhesive coating and thereafter completing the setting of said partially cured adhesive by means of heat.

2. The process of metallizing an electrically non-conductive article comprising the steps of providing said article with a coating of a thermosetting adhesive which cures in stages and which is selected from the group consisting of polyamide epoxy resins, phenol-formaldehyde resins, urea-formaldehyde resins, and melamine-formaldehyde resins; partially curing said adhesive to the "B" stage; chemically depositing a porous metal layer on said partially cured adhesive coating and thereafter completing the setting of said partly cured adhesive by means of heat.

3. The process of claim 2 wherein the provided coating of adhesive has a thickness between 0.001" and 0.005" and wherein a continuous layer of metal is electrodeposited on said porous layer prior to the completion of the setting of said partly cured adhesive.

4. The process of claim 3 wherein said porous metal and said continuous metal layer are unlike.

5. The process of claim 3 wherein said heating step is carried out under pressure.

6. The process of claim 3 wherein said thermosetting adhesive is a polyamide epoxy resin.

7. The process of claim 2 wherein said adhesive is a phenol-formaldehyde resin.

References Cited in the file of this patent

UNITED STATES PATENTS

| | | |
|---|---|---|
| 2,637,404 | Bart | May 5, 1953 |
| 2,680,699 | Rubin | June 8, 1954 |
| 2,728,693 | Cado | Dec. 27, 1955 |
| 2,762,897 | Vrooman et al. | Sept. 11, 1956 |